United States Patent
Dupont et al.

(10) Patent No.: US 12,072,784 B2
(45) Date of Patent: Aug. 27, 2024

(54) MULTI-STAGE ANOMALY DETECTION AND REMEDIATION

(71) Applicant: Oracle International Corporation, Redwood Shores, CA (US)

(72) Inventors: Joel Dupont, Mountain View, CA (US); Soumen Kundu, Fremont, CA (US); Venugopal Puli, McKinney, TX (US); Rajesh Bajya, Teh - Makrana (IN); Shashi Kanth Gottipati, Hyderabad (IN); Pier Paolo Fiorentino, Orlando, FL (US); Santhosh Reddy Chereku, Mckinney, TX (US); Mihai Ciocan, Bucharest (RO); Gabriela Tofan, Tunari (RO)

(73) Assignee: Oracle International Corporation, Redwood Shores, CA (US)

( * ) Notice: Subject to any disclaimer, the term of this patent is extended or adjusted under 35 U.S.C. 154(b) by 137 days.

(21) Appl. No.: 17/967,287

(22) Filed: Oct. 17, 2022

(65) Prior Publication Data

US 2024/0126677 A1 Apr. 18, 2024

(51) Int. Cl.
*G06F 11/00* (2006.01)
*G06F 11/07* (2006.01)
(Continued)

(52) U.S. Cl.
CPC ...... *G06F 11/3612* (2013.01); *G06F 11/0751* (2013.01); *G06F 11/0793* (2013.01); *G06F 11/3409* (2013.01)

(58) Field of Classification Search
CPC ............ G06F 11/0751; G06F 11/0793; G06F 11/3612; G06F 11/079; G06F 11/3409
See application file for complete search history.

(56) References Cited

U.S. PATENT DOCUMENTS

| 10,042,697 | B2 | 8/2018 | Ahad | |
|---|---|---|---|---|
| 11,307,557 | B2 | 4/2022 | Rinke et al. | |
| 2007/0033273 | A1* | 2/2007 | White | G06F 8/30 709/223 |

OTHER PUBLICATIONS

Joengmin Hwang et al., Exploring In-Situ Sensing Irregularity in Wireless Sensor Networks, Nov. 6-9, 2007, [Retrieved on Mar. 19, 2024]. Retrieved from the internet: <URL: https://dl.acm.org/doi/pdf/10.1145/1322263.1322291> 16 Pages (289-303) (Year: 2007).*

(Continued)

*Primary Examiner* — Anibal Rivera
(74) *Attorney, Agent, or Firm* — Invoke (57) ABSTRACT

Techniques for managing anomalies in a software system include monitoring the software system for anomalies via a plurality of signals and determining that signal results associated with the signals indicate a presence of an anomaly in the software system. The techniques also include identifying a hierarchy of sensors associated with the anomaly, where the hierarchy includes a parent sensor and a set of child sensors that are direct or indirect descendants of the parent sensor. The techniques additionally include executing the parent and child sensors to analyze the software system for one or more causes of the anomaly, and determining the cause(s) of the anomaly based on sensor results generated by the parent and child sensors. Finally, the techniques include causing remediation of the cause(s) of the anomaly based on one or more child sensors associated with the cause(s) and one or more resolutions mapped to the child sensor(s).

20 Claims, 4 Drawing Sheets

(51) Int. Cl.
G06F 11/36 (2006.01)
G06F 11/34 (2006.01)

(56) References Cited

OTHER PUBLICATIONS

Yaqoob J. Y. Al-Raisi et al., Tracking Sensor Node Operation Deviations in Wireless Sensor Networks, Oct. 26, 2007, [Retrieved on Mar. 19, 2024]. Retrieved from the internet: <URL: https://dl.acm.org/doi/pdf/10.1145/1298275.1298293> 4 Pages (84-87) (Year: 2007).*

"AvailabilityGuard™ for Hybrid IT", Retrieved from https://www.continuitysoftware.com/products/availabilityguard/, Retrieved on Oct. 19, 2022, 2 Pages.

"Machine Learning Anomaly Detection Methods for APM", Retrieved from https://www.appdynamics.com/learn/anomaly-detection-application-monitoring, Retrieved on Oct. 19, 2022, 8 Pages.

"Proactive detection with applied intelligence—New Relic" Retrieved from https://docs.newrelic.com/docs/alerts-applied-intelligence/applied-intelligence/anomaly-detection/anomaly-detection-applied-intelligence/, Retrieved on May 27, 2022, 2 Pages.

"Proactive Monitoring", Retrieved from https://www.datadoghq.com/proactive-monitoring/, , Retrieved on May 27, 2022, 2 Pages.

"ScienceLogic SL1 Solutions", Retrieved from https://sciencelogic.com/wp-content/uploads/2022/01/Datasheet-ScienceLogic-SL1-Solutions_2022.pdf, 2022, 8 Pages.

"SOLUTIONS—ThousandEyes + AppDynamics", Retrieved from https://www.thousandeyes.com/solutions/AppDynamics, ThousandEyes Summit: Cloud State 2022, 8 Pages.

"You Now Have The Power To Prevent Outages", Retrieved from https://info.moogsoft.com/rs/092-EGH-780/images/moogsoft-aiops-overview.pdf, 2020, 2 Pages.

Aharon, "How to Proactively Detect and Repair Common Misconfigurations on AWS Using AvailabilityGuard NXG", Retrieved from https://aws.amazon.com/blogs/apn/how-to-proactively-detect-and-repair-common-misconfigurations-on-aws-using-availabilityguard-nxg/, Dec. 17, 2019, 8 Pages.

Ajouz M., "Transform Customer Experience with Predictive Support", Apr. 28, 2021, 5 pages.

Ellatif et al., "Detecting Deviations in Business Processes Using Process Mining", 14th International Conference on Computer Engineering and Systems, 2019, 6 Pages.

Khanna, "The Truth About Predictive Analytics in IT Monitoring", Retrieved from https://www.moogsoft.com/blog/aiops/predictive-analytics-truth/, Dec. 14, 2016, 8 Pages.

Weinzierl et al., "Predictive business process deviation monitoring", Twenty-Ninth European Conference on Information Systems (ECIS 2021), 17 Pages.

* cited by examiner

MULTI-STAGE ANOMALY DETECTION AND REMEDIATION

TECHNICAL FIELD

The present disclosure relates to anomaly detection. In particular, the present disclosure relates to multi-stage anomaly detection and remediation.

BACKGROUND

A software anomaly corresponds to a deviation from the normal operation or performance of a software system. For example, a software anomaly may include a slowdown in the execution of a process by the software system, a bug in the software system, fraudulent or malicious use of the software system, or another condition or combination of conditions that causes the software system to behave in an unexpected manner.

Software anomalies are typically detected and resolved via a time-consuming, inefficient, and resource-intensive process. For example, a user of an application may initially report an anomaly to a support team. The support team may search a knowledge base to identify similar issues and attempt to find a solution for the anomaly. Frequently, the support team may also engage with developers or operations teams associated with the application to determine the cause of the anomaly and subsequently develop and execute patches and/or other code that address the cause of the anomaly. The support team (and associated teams) may additionally repeat the process of manually analyzing and resolving issues for each anomaly reported by a user, even when multiple users report the same anomaly and/or multiple instances of an anomaly are associated with the same cause.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MULTI-STAGE ANOMALY DETECTION AND REMEDIATION
4. EXAMPLE EMBODIMENT
5. DETECTING AND REMEDYING ANOMALIES IN A SOFTWARE SYSTEM
6. COMPUTER NETWORKS AND CLOUD NETWORKS
7. MISCELLANEOUS; EXTENSIONS
8. HARDWARE OVERVIEW

1. General Overview

Techniques for performing multi-stage anomaly detection and remediation in software systems are disclosed. A software system is monitored for anomalies using a number of signals. For example, a cloud-based application may be scanned periodically, continuously, and/or based on one or more conditions for "signals" associated with potential anomalies in the software system. Each signal may include and/or generate output indicating whether or not a corresponding anomaly (e.g., deviation in performance, bug, failure, error, etc.) has been detected.

When a signal indicates that a corresponding anomaly is detected in the software system, a hierarchy of sensors associated with the signal and/or anomaly is used to determine one or more causes of the anomaly. The hierarchy includes multiple levels of sensors grouped under the signal and/or anomaly. Each sensor in the hierarchy represents a certain cause or category of causes of the anomaly. Each sensor at a given level within the hierarchy can also be associated with one or more "child" sensors at a lower level in the hierarchy. These child sensors are used to perform more fine-grained analysis of the corresponding cause (or category of causes) of the anomaly.

More specifically, after a signal returns a result indicating that a corresponding anomaly is detected, one or more sensors in the highest level of the hierarchy associated with the signal and/or anomaly are executed. Each of the executed sensors generates a sensor result indicating whether or not a corresponding cause (or category of causes) of the anomaly is detected. When a highest-level sensor returns a positive sensor result indicating that the corresponding cause (or category of causes) of the anomaly has been found, one or more child sensors mapped to the highest-level sensor within the hierarchy can be executed to further diagnose the cause of the anomaly. Each of the executed child sensors also generates a sensor result indicating whether or not the corresponding cause (or category of causes) of the anomaly is detected. As a result, the cause of the anomaly can be determined via chained execution of sensors within the hierarchy, where a positive sensor result generated by a sensor at a higher level of the hierarchy triggers the execution of any child sensors of the sensor at a lower level of the hierarchy.

Sensor results generated by the sensors are also used to determine and/or trigger resolutions for the corresponding causes (or categories of causes) of anomalies. In particular, a sensor at any level of the hierarchy can be mapped to a resolution for the corresponding cause (or category of causes) of anomaly. When the sensor returns a positive sensor result indicating that the corresponding cause (or category of causes) of the anomaly has been found, the resolution is triggered to allow for automatic remediation of the cause (or category of causes) of the anomaly. For example, the sensor may be mapped to a script, configuration, patch, or executable that can be used to resolve the corresponding cause of the anomaly. The sensor may also, or instead, be mapped to a user, team, or workflow that can be triggered or notified about the cause of the anomaly. When the sensor returns a positive sensor result, the corresponding resolution is performed to automatically effect remediation of the cause of the anomaly.

One or more embodiments described in this Specification and/or recited in the claims may not be included in this General Overview section.

2. Architectural Overview

Figure 1:
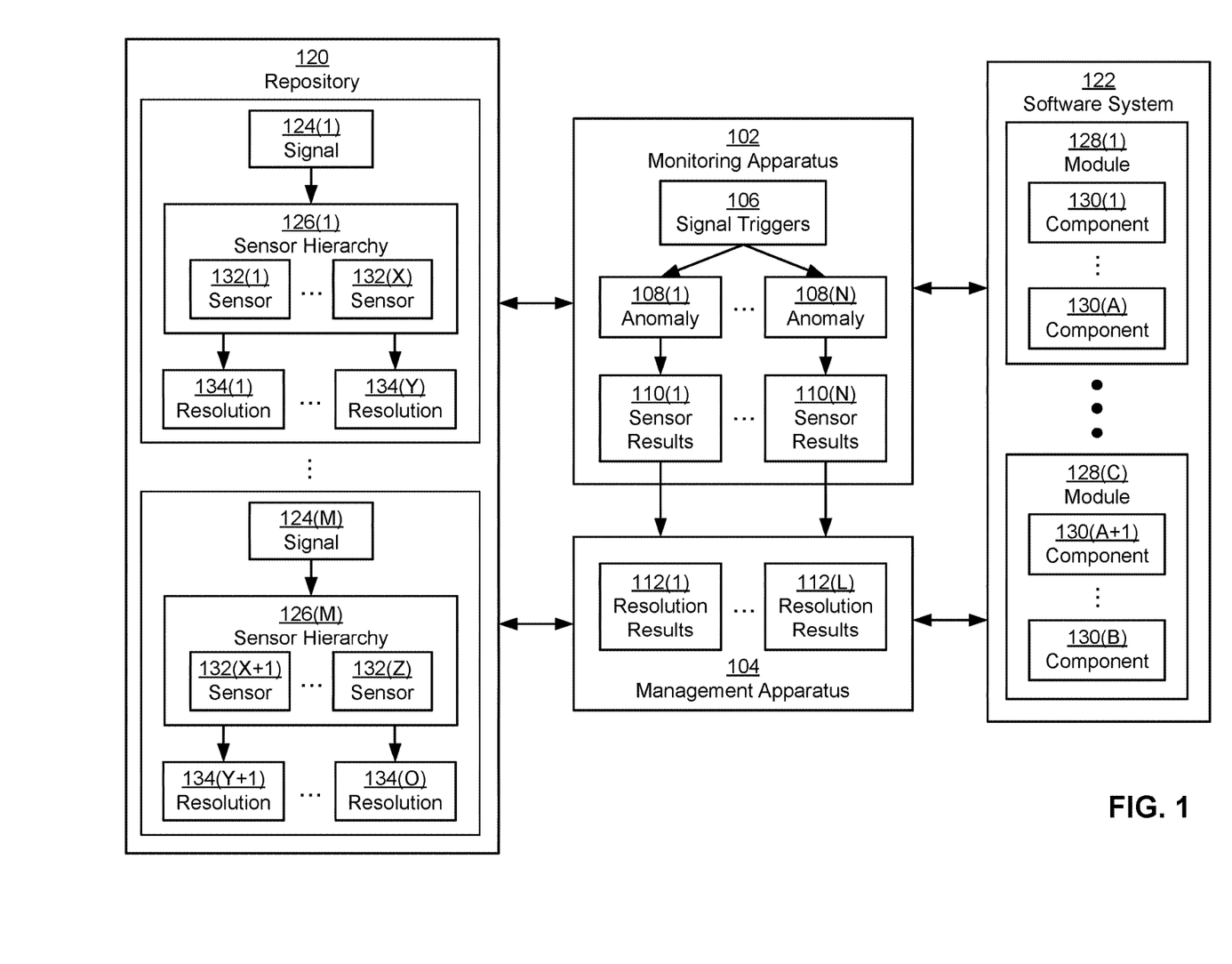
FIG. 1 illustrates a system in accordance with one or more embodiments.

FIG. 1 illustrates a system in accordance with one or more embodiments. As illustrated in FIG. 1, the system includes a monitoring apparatus 102 and a management apparatus 104. Each of these components is described in further detail below.

In some embodiments, monitoring apparatus 102 and management apparatus 104 are used to detect, diagnose, and remedy anomalies in a software system 122. Software system 122 includes an application, a database, a software suite, a framework, a cloud computing system, a distributed system, an operating system, and/or another collection of software-based modules 128(1)-128(C) (each of which is referred to individually as module 128).

Each module 128 represents a discrete set of functionality within software system 122. For example, each module 128 may implement one or more workflows (e.g., batch processing workflows, data workflows, machine learning workflows, application workflows, etc.), a layer in a software or technology stack, an interface, an application within a software suite, a library, a data store, and/or another independent subset of functionality associated with software system 122.

Each module 128 in software system 122 includes a corresponding set of components 130(1)-130(A) and 130(A+1)-130(B). More specifically, module 128(1) is implemented using one set of components 130(1)-130(A), and module 128(C) is implemented using a different set of components 130(A+1)-130(B). Each of components 130(1)-130(A) and 130(A+1)-130(B) is referred to individually as component 130. Components 130 include user interface (UI) components, services, service endpoints, widgets, timers, threading assistants, servers, frontend components, filesystems, data stores, and/or other parts of software system 122 that execute and/or interact with one another to implement the functionality of the corresponding modules 128.

Monitoring apparatus 102 and management apparatus 104 include functionality to detect, diagnose, and remedy anomalies 108(1)-108(N) (each of which is referred to individually as anomaly 108) in software system 122. Each anomaly 108 represents a deviation from expected behavior, operation, performance, or usage of software system 122. For example, each anomaly 108 may correspond to a slowdown in the execution of a certain process by software system 122, an error or failure in software system 122, a bug in software system 122, fraudulent or malicious use of software system 122, a deviation from an expected timeline or deadline for a certain process in software system 122, a deviation from expected usage of a certain module 128 in software system 122, and/or another condition or combination of conditions that causes software system 122 and/or a functional module 128 in software system 122 to behave in an unexpected manner.

In one or more embodiments, monitoring apparatus 102 and management apparatus 104 use a collection of signals 124(1)-124(M) (each of which is referred to individually as signal 124), sensor hierarchies 126(1)-126(N) (each of which is referred to individually as sensory hierarchy 126) associated with individual signals 124, sensors 132(1)-132(X) and 132(X+1)-132(Z) (each of which is referred to individually as sensor 132) within sensor hierarchies 126, and resolutions 134(1)-134(Y) and 134(Y+1)-134(0) associated with individual sensors 132 in sensor hierarchies 126 to monitor and manage anomalies 108 in software system 122. Definitions of signals 124, sensor hierarchies 126, sensors 132, and resolutions 134 and relationships among signals 124, sensor hierarchies 126, sensors 132, and resolutions 134 are stored in a repository 120 and retrieved by monitoring apparatus 102 and management apparatus 104 for subsequent use. For example, repository 130 may store signals 124, sensor hierarchies 126, sensors 132, resolutions 134, and mappings representing relationships among signals 124, sensor hierarchies 126, sensors 132, and resolutions 134 in one or more files, tables, data structures, and/or other formats. As described in further detail below, signals 124, sensor hierarchies 126, resolutions 134, and the corresponding relationships allow monitoring apparatus 102 and management apparatus 104 to automatically detect, diagnose, and remedy anomalies 108 in software system 122, thereby reducing resource overhead and latency associated with managing anomalies 108 and improving the performance of software system 122 and the efficiency with which modules 128 in software system 122 are used.

In one or more embodiments, the system may include more or fewer components than the components illustrated in FIG. 1. The components illustrated in FIG. 1 may be local to or remote from each other. For example, monitoring apparatus 102 and management apparatus 104 may be implemented together and/or separately using one or more hardware and/or software components. Such components may include, but are not limited to, applications, log-analysis components, servers, virtual machines, instrumentation, and/or other mechanisms for monitoring and managing software system 122 on a real-time, near-real-time, and/or offline basis. Such components may be local to or remote from each other and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

As shown in FIG. 1, signals 124, sensor hierarchies 126, sensors 132, and resolutions 134 are related to one another and/or defined within a repository 120. In one or more embodiments, repository 120 is any type of storage unit and/or device (e.g., a file system, database, collection of tables, key-value store, collection of files, or any other storage mechanism) for storing data. Further, a repository 120 may include multiple different storage units and/or devices. The multiple different storage units and/or devices may or may not be of the same type or located at the same physical site. For example, repository 120 may be implemented or may execute on the same computing system or environment as monitoring apparatus 102, management apparatus 104, and/or software system 122 or on a computing system or environment that is separate from monitoring apparatus 102, management apparatus 104, and/or software system 122. Repository 120 may be communicatively coupled to monitoring apparatus 102, management apparatus 104, and/or software system 122 via a direct connection or via a network. Further, repository 120 may include multiple different storage units and/or devices. The multiple different storage units and/or devices may or may not be of the same type or located at the same physical site.

In one or more embodiments, monitoring apparatus 102 and/or management apparatus 104 include hardware and/or software configured to perform operations described herein for detecting and remedying anomalies 108 in software system 122 (or other types of systems). Examples of such operations are described below.

In an embodiment, the system of FIG. 1 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, an interface refers to hardware and/or software configured to facilitate communications between a user and monitoring apparatus 102, management apparatus 104, repository 120, and/or software system 122. The interface can render user interface elements and receive input via the user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the interface is specified in one or more other languages, such as Java, C, or C++.

3. Multi-Stage Anomaly Detection and Remediation

As mentioned above, monitoring apparatus 102 and management apparatus 104 use signals 124, sensor hierarchies 126, sensors 132, and resolutions 134 that are defined and organized within repository 120 to detect and diagnose anomalies 108 in software system 122 in an automated and/or streamlined manner. More specifically, monitoring apparatus 102 uses signals 124 to monitor software system 122 for anomalies 108. Each signal 124 generates, analyzes, and/or includes data related to one or more states and/or conditions associated with the operation of one or more modules 128 in software system 122. For example, each signal 124 may involve log entries, metrics, events, exceptions, errors, failures, and/or other data collected from or generated by one or more modules 128.

Each signal 124 also includes thresholds, comparisons, evaluations, and/or other operations that can be used to determine whether one or more corresponding anomalies 108 are detected in software system 122. For example, a given signal 124 may define a corresponding anomaly 108 as a certain number of failures over a period of time and/or a certain number of consecutive failures within a given module 128 in software system 122. In another example, a given signal 124 may define a corresponding anomaly 108 as a degradation in throughput, a change in thread count, an increase in processing time, and/or another deviation in performance or operation for a certain workflow or module 128 in software system 122. In a third example, a given signal 124 may define a corresponding anomaly 108 as an increase in data defects beyond a numeric threshold and/or a percentage threshold that is based on the number of data defects detected over a previous time period (e.g., the previous week or month). In a fourth example, a given signal 124 may define a corresponding anomaly 108 as a workflow that has not completed by a corresponding deadline. In a fifth example, signals 124 include features that are inputted into a machine learning model. In response to the inputted features, the machine learning model generates one or more outputs that include predicted likelihoods associated with various types of anomalies in software system 122.

In one or more embodiments, monitoring apparatus 102 executes and/or evaluates signals 124 that are used to detect anomalies 108 in software system 122 based on a set of signal triggers 106. Signal triggers 106 include various types of conditions under which the corresponding signals 124 are to be executed or evaluated. For example, signal triggers 106 may specify execution and/or evaluation of the corresponding signals 124 according to certain frequencies, such as hourly, daily, weekly, and/or monthly. In another example, signal triggers 106 may be used to execute or evaluate one or more signals 124 a certain number of hours or days before or after a deadline or another type of scheduled event. In a third example, one or more signal triggers 106 may specify continuous or repeated execution of the corresponding signals 124.

When a given signal 124 indicates that a certain anomaly 108 is detected in software system 122, monitoring apparatus 102 uses a corresponding sensor hierarchy 126 to diagnose one or more causes of that anomaly 108. For example, monitoring apparatus 102 may use a mapping between that signal 124 and/or anomaly 108 and the corresponding sensor hierarchy 126 in repository 120 to identify and retrieve sensor hierarchy 126 from repository 120.

In some embodiments, each sensor hierarchy 126 includes a set of sensors 132 that are grouped under or associated with a corresponding signal 124 and/or anomaly 108. As shown in FIG. 1, sensor hierarchy 126(1) includes a set of sensors 132(1)-132(X) that are grouped under signal 124(1), and sensor hierarchy 126(M) includes a set of sensors 132(X+1)-132(Z) that are grouped under signal 124(M).

Each sensor 132 is used to determine a certain cause or category of causes of a corresponding anomaly 108 (e.g., the anomaly detected by a signal to which the sensor hierarchy is mapped). For example, each sensor 132 may be used to run database queries, analyze logs, perform tests, and/or conduct other types of analysis associated with a corresponding anomaly 108 and one or more components 130 of software system 122. After a given sensor 132 has finished retrieving and/or analyzing the corresponding data or portion of software system 122, the sensor generates one or more sensor results 110(1)-110(N) (each of which is referred to individually as sensor result 110) indicating whether or not a certain cause (or category of causes) of the corresponding anomaly 108 has been found. For example, each sensor 132 that has finished executing may generate either a positive sensor result indicating that a certain cause (or category of causes) of the corresponding anomaly 108 has been detected or a negative sensor result indicating that the cause (or category of causes) of the corresponding anomaly 108 has not been detected.

Further, sensors 132 within sensor hierarchies 126 are organized into multiple levels that correspond to different granularities in analyzing the causes of the corresponding anomalies 108. Directed edges between sensors 132 in different levels of a given sensor hierarchy 126 indicate the order in which those sensors 132 should be traversed within sensor hierarchy 126 to analyze the cause(s) of a given anomaly 108. For example, a given sensor hierarchy 126 may include a tree structure with three levels of sensors 132. The highest level includes one or more sensors 132, each of which evaluates a group of components 130 for configurations, failures, errors, or other issues that can cause the corresponding anomaly 108. Each sensor 132 in the highest level of the hierarchy may have a parent-child relationship with one or more sensors 132 in the middle level of sensor hierarchy 126. This parent-child relationship may be represented by directed edges from the sensor 132 in the highest level of the hierarchy to the sensor(s) in the middle level of sensor hierarchy 126. Sensors 132 in the middle level of sensor hierarchy 126 may perform more fine-grained analysis of components 130 than the corresponding "parent" sensors 132 in the highest level of sensor hierarchy 126. Each sensor 132 in the middle level of sensor hierarchy 126 may also include directed edges to one or more sensors 132 in the lowest level of sensor hierarchy 126 to indicate parent-child relationships between the sensor 132 in the middle level of the hierarchy and the sensor(s) in the lowest level of sensor hierarchy 126. Sensors 132 in the lowest level of the hierarchy may perform more fine-grained analysis of components 130 than the corresponding "parent" sensors 132 in the middle level of the hierarchy. Thus, each sensor in the middle level of sensor hierarchy 126 may be a direct descendant of a sensor in the highest level of sensor hierarchy 126, and each sensor in the lowest level of sensor hierarchy 126 may correspond to a direct descendant of a sensor in the middle level of sensor hierarchy 126 and an indirect descendant of a sensor in the highest level of sensor hierarchy.

Sensors 132 in the lowest level of a given sensor hierarchy 126 and/or sensors 132 that do not have any "child" sensors 132 in lower levels of that sensor hierarchy 126 are associated with resolutions 134 for the corresponding causes of anomalies 108. For example, a given sensor 132 that does not include "child" sensors 132 in sensor hierarchy 126 may include a directed edge to a resolution 134 for the cause of anomaly 108 detected by that sensor 132. Each resolution 134 includes a plan, workflow, or action for remedying a corresponding cause of anomaly 108. For example, a given resolution 134 may include a change in configuration, a notification that is sent to a particular user or team, an executable script or patch, and/or another mechanism for removing the corresponding cause of anomaly 108.

To analyze and diagnose the causes of a given anomaly 108 in software system 122, monitoring apparatus 102 executes one or more sensors 132 in the highest level of sensor hierarchy 126 mapped to that anomaly 108 and/or a corresponding signal 124 for detecting that anomaly 108. When a highest-level sensor 132 returns a positive sensor result indicating that a certain cause (or category of causes) of that anomaly 108 has been found, monitoring apparatus 102 executes one or more sensors 132 that are mapped to the highest-level sensor 132 and reside one level below the highest level to "drill down" into the cause of that anomaly 108. If any of these sensors 132 also returns a positive sensor result, monitoring apparatus 102 executes one or more sensors that are grouped under these sensor(s) and reside two levels below the highest level to analyze the causes of that anomaly 108 in an even more fine-grained manner. This process is repeated until monitoring apparatus 102 has traversed one or more "chains" of sensors 132 with positive sensor results 110 within sensor hierarchy 126.

When a given sensor 132 returns a positive sensor result and is mapped to a corresponding resolution 134 within repository 120, management apparatus 102 causes the corresponding resolution 134 to be performed to allow for automatic remediation of the cause (or category of causes) of the anomaly. For example, a given sensor 132 may be mapped to a script, configuration, or executable program that can be used to resolve the identified cause of anomaly 108. A given sensor 132 may also, or instead, be mapped to a user, team, or workflow that can be notified about the cause of anomaly 108 and the remedy for the cause of anomaly 108. When the sensor returns a positive sensor result, management apparatus 102 automatically carries out the corresponding resolution 134 to effect remediation of the cause of anomaly 108.

At times, sensors 132 in a given sensor hierarchy 126 can generate negative sensor results 110 indicating that the corresponding causes of anomaly 108 are not detected. In this type of situation, monitoring apparatus 102 and management apparatus 104 may be unable to identify or carry out any resolutions 134 for anomaly 108 using the existing signal 124 and/or sensor hierarchy 126. Instead, monitoring apparatus 102 and/or management apparatus 104 trigger a manual root cause analysis of that anomaly 108 by one or more users and/or teams. These users and/or teams can identify one or more causes of that anomaly 108, develop new sensors 132 and/or resolutions 134 for that cause, and add the new sensors 132 and/or resolutions 134 to the corresponding sensor hierarchy 126 and/or repository 124. Once repository 124 has been populated with the new sensors 132 and/or resolutions 134, monitoring apparatus 102 and management apparatus 104 can use the new sensors 132 and/or resolutions 134 to determine and remedy the corresponding causes of that anomaly 108.

Similarly, users and/or teams can create new signals 124, sensor hierarchies 126 grouped under the new signals 124, and resolutions 134 associated with sensors 132 within those sensor hierarchies 126. These new signals 124, sensor hierarchies 126, and resolutions 134 can be added to repository 120 and used to detect, analyze, and resolve new types of anomalies 108 in software system 122 (e.g., as modules 128 and/or components 130 are added or updated within software system 122).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 2:
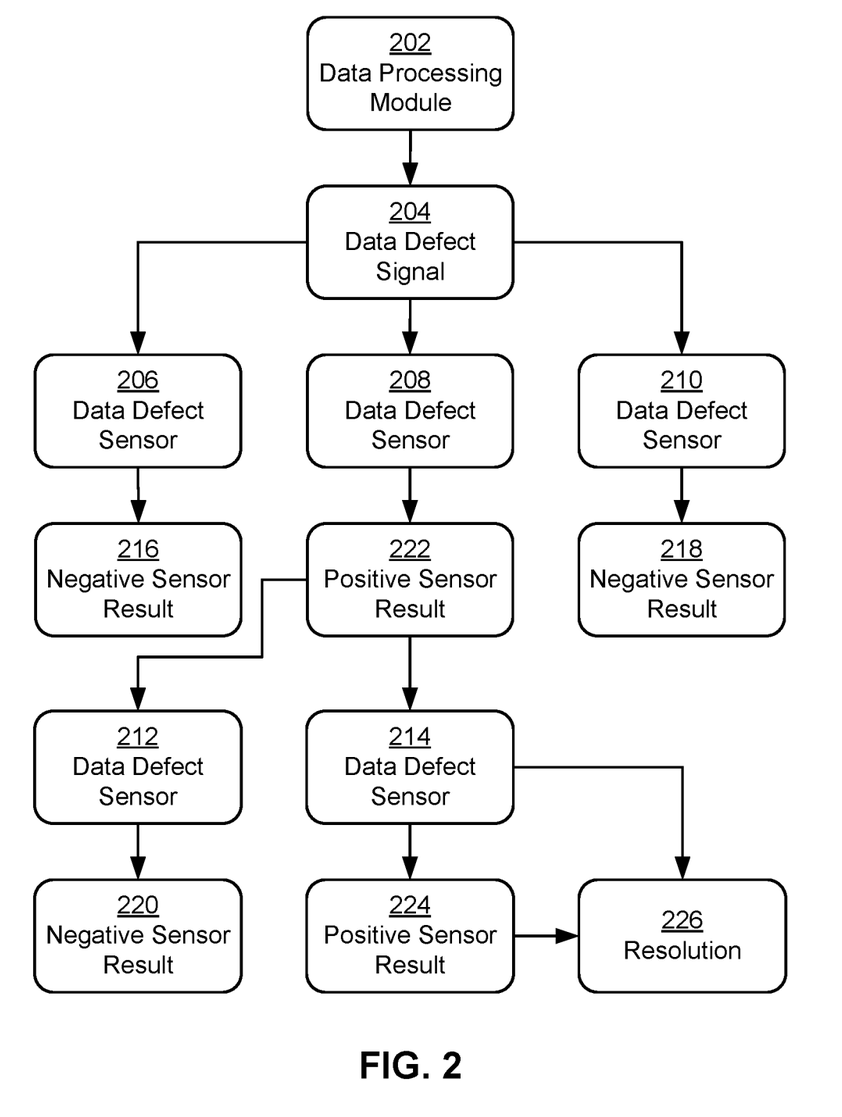
FIG. 2 illustrates an example set of operations for performing anomaly detection and remediation in a software system in accordance with one or more embodiments.

FIG. 2 illustrates an example set of operations for performing anomaly detection and remediation in a software system in accordance with one or more embodiments. As shown in FIG. 2, a data defect signal 204 is used to detect an anomaly in the operation of a data processing module 202 in a software system (e.g., software system 122 of FIG. 1). For example, data defect signal 204 may be used to detect errors or issues associated with the formatting, completeness, integrity, accuracy, and/or structure of data that is generated and/or processed by data processing module 202.

As mentioned above, data defect signal 204 can be associated with one or more signal triggers (e.g., signal triggers 106 of FIG. 1) that specify conditions under which data defect signal 204 is to be executed or evaluated. For example, data defect signal 204 may be triggered before the deadline for completing a workflow and/or before a certain time at which the workflow is scheduled (e.g., three days, two days, and one day before the deadline or scheduled time). Data defect signal 204 may also, or instead, be triggered a certain number of times and/or based on a certain frequency (e.g., a certain number of times per day and/or a certain number of days per week).

In the example of FIG. 2, data defect signal 204 is associated with a sensor hierarchy (e.g., sensor hierarchies 126 of FIG. 1) that includes at least two levels of data defect sensors 206-214. The first level of the sensor hierarchy includes three data defect sensors 206-210 that can be used to run checks that detect the anomaly represented by data defect signal 204. For example, the first level of defect sensors 206-210 may be executed according to the schedule and/or conditions specified in one or more signal triggers for data defect signal 204. Sensor results (e.g., sensor results 110 of FIG. 1) generated by this first level of data defect sensors 206-210 may be used to determine whether or not the anomaly is found in data processing module 202. More specifically, a positive sensor result 222 generated by data defect sensor 208 may indicate that the anomaly has been detected via data defect signal 204.

Detection of the anomaly using data defect signal 204 can also, or instead, be performed separately from the operation of the first subset of data defect sensors 206-210. For example, data defect signal 204 may include a first set of checks on data used by data processing module 202. After the anomaly is detected by the first set of checks, the first subset of data defect sensors 206-210 may be triggered to diagnose the cause of the anomaly.

As shown in FIG. 2, data defect sensor 206 generates a negative sensor result 216, data defect sensor 210 similarly generates a negative sensor result 218, and data defect sensor 208 generates positive sensor result 222. Negative sensor results 216 and 218 indicate that the anomaly is not caused by the portions of data processing module 202 examined by data defect sensors 206 and 210, respectively. Conversely, positive sensor result 222 indicates that the anomaly is caused by the portions of data processing module 202 examined by data defect sensor 208.

In response to positive sensor result 222, two data defect sensors 212-214 in a second level of the sensor hierarchy are executed. For example, the emission of positive sensor result 222 by data defect sensor 208 may trigger the execution of data defect sensors 212-214 to perform finer-grained analysis of the cause of the anomaly represented by positive sensor result 222. In addition, directed edges from data defect sensor 208 to data defect sensors 212-214 within the sensor hierarchy may be used to identify data defect sensors 212-214 as "child" sensors of data defect sensor 208. These directed edges may indicate that data defect sensors 212-214 are to be used to perform finer-grained analysis of the cause of the anomaly represented by positive sensor result 222 (e.g., by performing more specific analysis and/or testing of the portions of data processing module 202 examined by data defect sensor 208).

Data defect sensor 212 generates a negative sensor result 220, which indicates that the anomaly is not caused by the portions of data processing module 202 examined by data defect sensor 212. On the other hand, data defect sensor 214 generates a positive sensor result 224 indicating that the anomaly is caused by the portions of data processing module 202 examined by data defect sensor 214.

Data defect sensor 214 is additionally associated with a resolution 226, which is triggered in response to positive sensor result 224. For example, data defect sensor 214 may be mapped to resolution 226 in a repository (e.g., repository 120 of FIG. 1). After positive sensor result 224 is generated by data defect sensor 214, the mapping of data defect sensor 214 to resolution 226 may be used to retrieve resolution 226, and one or more actions (e.g., alerts, notifications, configuration changes, requests for review, workflows, patches, etc.) may be performed to carry out or effect resolution 226.

5. Detecting and Remedying Anomalies in a Software System

Figure 3:
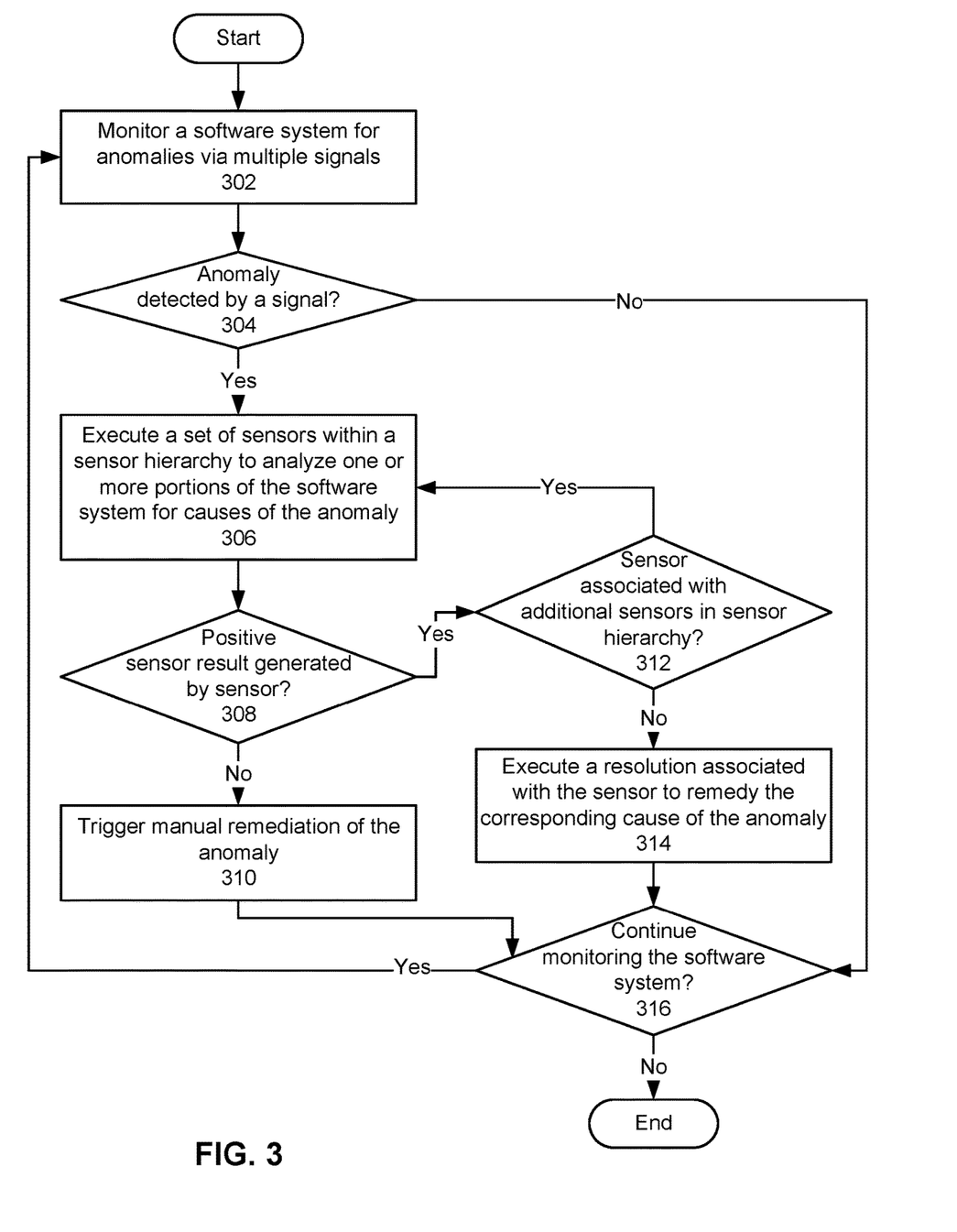
FIG. 3 illustrates a flowchart of performing anomaly detection in a software system in accordance with one or more embodiments.

FIG. 3 illustrates a flowchart of performing anomaly detection in a software system in accordance with one or more embodiments. In one or more embodiments, one or more of the steps may be modified, omitted, repeated, and/or performed in a different order. Accordingly, the specific arrangement of steps shown in FIG. 3 should not be construed as limiting the scope of one or more embodiments.

Initially, a software system is monitored for anomalies via multiple signals (operation 302). For example, each signal may be used to monitor, check, or test a particular functional module within the software system (or another portion of the software system) for anomalous behavior, performance, or operation. Each signal may also be triggered based on a corresponding frequency (e.g., a certain number of seconds, minutes, hours, days, weeks, etc. since the last time the signal was triggered), a deadline or timeline (e.g., a certain number of hours or days before and/or after the deadline or a date in the timeline), one or more conditions (e.g., use of a particular portion of the software system, execution of a workflow in the software system, etc.), and/or other criteria.

While the software system is monitored for anomalies, an anomaly may be detected by a signal (operation 304). For example, the signal may detect an anomaly as a certain number of errors or failures in a corresponding portion of the software system; a deviation from expected operation or usage of the software system beyond a threshold; a deviation in a configuration and/or one or more settings from a "default," "expected," or "optimal" configuration or set of settings; and/or another condition related to the state of the software system. If no anomalies are detected by the signals, monitoring of the software system may continue (operation 316).

When an anomaly is detected by a signal in operation 304, a set of sensors within a sensor hierarchy is executed to analyze one or more portions of the software system for causes of the anomaly (operation 306). For example, the signal and/or anomaly may be mapped to the sensor hierarchy in a repository and/or another data store. After the anomaly is detected by the signal, the sensor hierarchy may be retrieved from the data store, and one or more sensors in the highest level of the sensor hierarchy may be executed to determine if the anomaly is associated with one or more corresponding causes.

The executed set of sensors may include a sensor that generates a positive sensor result (operation 308). This positive sensor result indicates that the sensor has detected a certain cause (or category of causes) of the anomaly. If no sensors in the executed set of sensors generate a positive sensor result, manual remediation of the anomaly is triggered (operation 310). For example, a notification, alert, or another communication related to the anomaly may be sent to one or more users and/or teams. The user(s) and/or team(s) may use the information in the communication and/or data associated with the signal and/or executed sensors to perform root cause analysis of the anomaly and/or resolve the anomaly. The user(s) and/or team(s) may also add new sensors and/or resolutions to the sensor hierarchy to allow further subsequent automated analysis and remediation of the cause associated with the anomaly.

When a positive sensor result is generated by a sensor, additional processing is performed based on whether or not the sensor is associated with additional sensors in the sensor hierarchy (operation 312). More specifically, the sensor may be connected to one or more additional "child" sensors in a lower level of the sensor hierarchy, or the sensor may be connected to a resolution of the corresponding cause of anomaly. When the sensor is not connected to the additional sensor(s) within the sensor hierarchy, the resolution is executed to remedy the corresponding cause of the anomaly (operation 314). For example, the resolution may involve notifying a user or team of the cause of the anomaly, providing the user or team with one or more actions to perform to remedy the anomaly, changing a configuration or setting within the software system, applying a patch to the software system, executing a workflow for remedying the anomaly, disabling a component associated with the cause of the anomaly, and/or another mechanism for addressing the cause of the anomaly.

When a given sensor generates a positive sensor result and is associated with additional sensors in the sensor hierarchy, operation 306 is repeated one or more times using the additional sensors to further determine the cause of the anomaly. Operations 308-314 are also repeated based on the sensor results generated by the additional sensors to remedy the anomaly.

Monitoring of the software system may also continue (operation 316) using the signals and sensors. For example, the software system may continue to be monitored using the signals and sensors while the software system is deployed and/or running within a given environment. While monitoring of the software system continues, operations 302-316 are repeated to detect, diagnose, and remedy anomalies in the software system. Operations 302-316 are no longer performed once the software system is no longer to be monitored.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
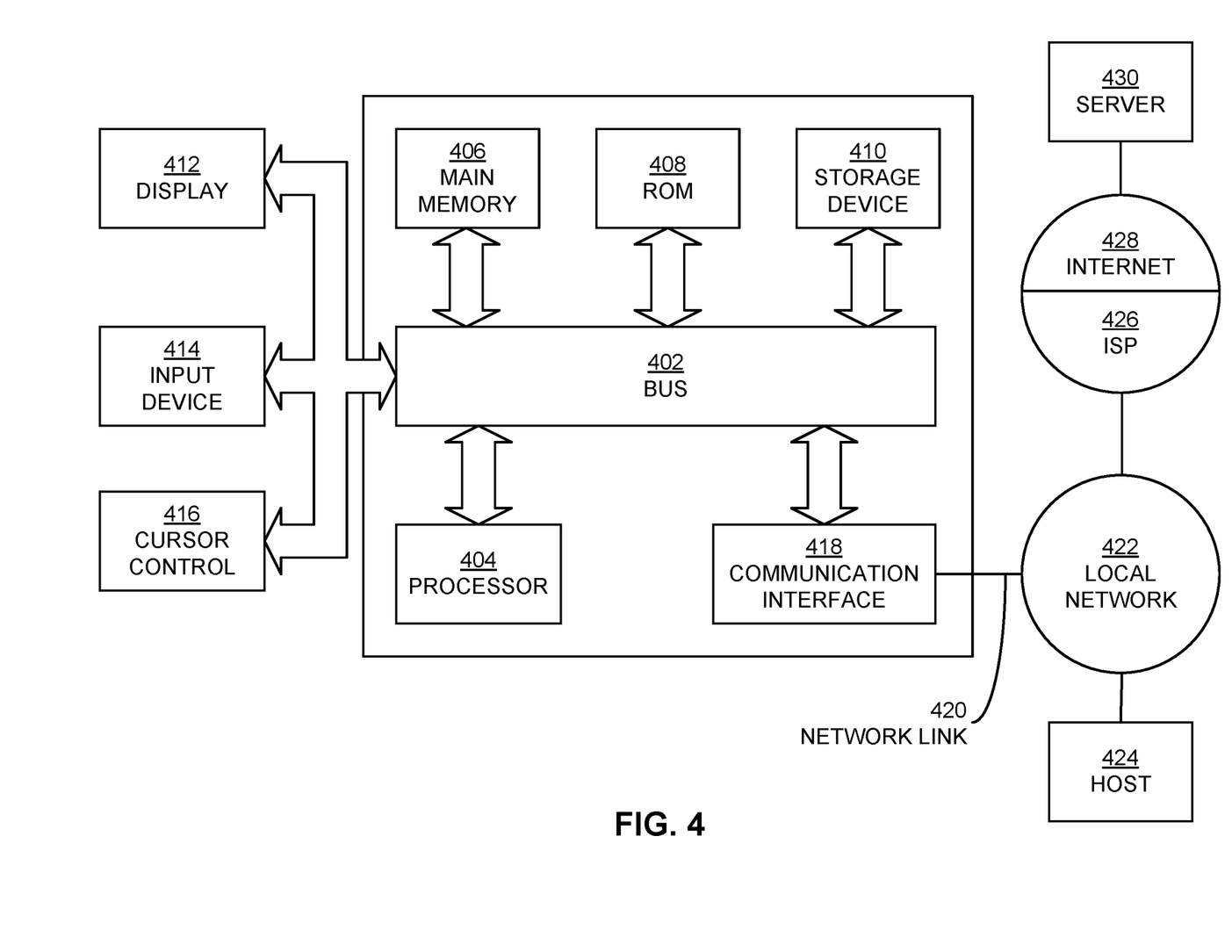
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   monitoring a software system for a plurality of anomalies via a plurality of signals;
   determining that one or more signal results associated with the plurality of signals indicate a presence of a first anomaly in the software system;
   identifying a first hierarchy of sensors associated with the first anomaly, wherein the first hierarchy of sensors includes (a) a parent sensor at a first level of the first hierarchy and (b) a first set of child sensors that are direct or indirect descendants of the parent sensor in the first hierarchy, the first set of child sensors being at a second level of the first hierarchy that is lower than the first level of the first hierarchy;
   executing the parent sensor and the first set of child sensors to analyze one or more portions of the software system for one or more causes of the first anomaly;
   determining the one or more causes of the first anomaly based on a first set of sensor results generated by the parent sensor and the first set of child sensors; and
   causing remediation of the one or more causes of the first anomaly based on one or more child sensors associated with the one or more causes of the first anomaly and one or more resolutions mapped to the one or more child sensors.

2. The medium of claim 1, wherein the operations further comprise:
   determining that a second set of sensor results generated by a second hierarchy of sensors associated with a second anomaly in the software system does not indicate a cause of the second anomaly; and
   in response to the second set of sensor results, causing one or more additional sensors associated with the second anomaly to be added to the second hierarchy of sensors.

3. The medium of claim 1, wherein the plurality of signals is used to monitor a plurality of functional modules within the software system.

4. The medium of claim 1, wherein executing the parent sensor and the first set of child sensors comprises:
   determining that the parent sensor has generated a positive sensor result indicating a first cause of the first anomaly;
   in response to the positive sensor result, determining the first set of child sensors based on one or more mappings associated with the parent sensor within the first hierarchy; and
   executing the first set of child sensors to generate one or more additional sensor results in the first set of sensor results.

5. The medium of claim 1, wherein determining the one or more causes of the first anomaly comprises matching a positive sensor result generated by a child sensor in the first set of child sensors to a cause of the first anomaly represented by the child sensor.

6. The medium of claim 1, wherein the one or more portions of the software system analyzed by the parent sensor and the first set of child sensors comprise at least one of a log, a user interface, a server, a software component, or data associated with the software system.

7. The medium of claim 1, wherein causing remediation of the one or more causes of the first anomaly comprises:
   determining that the one or more child sensors have generated one or more positive sensor results; and
   retrieving the one or more resolutions mapped to the one or more child sensors based on the one or more positive sensor results.

8. The medium of claim 1, wherein the one or more resolutions comprise at least one of an alert, a notification, a configuration, a patch, a user action, or a manual remediation.

9. The medium of claim 1, wherein the plurality of anomalies comprises at least one of a failure, a series of failures, an error, an increase in processing time, a reduction in throughput, an increase in failure rate, a change in usage of the software system, a deviation in thread count, or a lapsed deadline.

10. The medium of claim 1, wherein the first set of child sensors comprises at least one of a script, a query, or a software component.

11. The medium of claim 1, wherein the first set of child sensors corresponds to indirect descendants of the parent sensor, and wherein the operations further comprise iteratively executing one or more sets of sensors between the parent sensor and the first set of child sensors to analyze one or more additional portions of the software system for one or more additional causes of the first anomaly.

12. The medium of claim 1, wherein:
   the first hierarchy further includes a second set of child sensors that are direct descendants of the parent sensor;
   the first set of child sensors are direct descendants of a particular sensor in the second set of child sensors within the first hierarchy; and
   the second set of child sensors is executed to analyze one or more additional portions of the software system for one or more additional causes of the first anomaly prior to executing the first set of child sensors.

13. The medium of claim 1, wherein each signal in the plurality of signals is used to monitor the software system based on at least one of a schedule, a trigger, or a deadline.

14. The medium of claim 1, wherein determining that the first anomaly is present in the software system comprises applying a machine learning model to the plurality of signals to detect the first anomaly.

15. A method, comprising:
monitoring a software system for a plurality of anomalies via a plurality of signals;
determining that one or more signal results associated with the plurality of signals indicate a presence of a first anomaly in the software system;
identifying a first hierarchy of sensors associated with the first anomaly, wherein the first hierarchy of sensors includes (a) a parent sensor and (b) a first set of child sensors that are direct or indirect descendants of the parent sensor;
executing the parent sensor and the first set of child sensors to analyze one or more portions of the software system for one or more causes of the first anomaly;
determining the one or more causes of the first anomaly based on a first set of sensor results generated by the parent sensor and the first set of child sensors; and
causing remediation of the one or more causes of the first anomaly based on one or more child sensors associated with the one or more causes of the first anomaly and one or more resolutions mapped to the one or more child sensors.

16. The method of claim 15, further comprising:
determining that a second set of sensor results generated by a second hierarchy of sensors associated with a second anomaly in the software system does not indicate a cause of the second anomaly; and
in response to the second set of sensor results, causing one or more additional sensors associated with the second anomaly to be added to the second hierarchy of sensors.

17. The method of claim 16, further comprising causing one or more additional resolutions to be mapped to the one or more additional sensors.

18. The method of claim 15, wherein determining the one or more causes of the first anomaly comprises:
executing the parent sensor in a first level of the first hierarchy of sensors;
determining that the parent sensor has generated a positive sensor result indicating a first cause of the first anomaly;
in response to the positive sensor result, determining that the first set of child sensors correspond to direct descendants of the parent sensor within the first hierarchy; and
executing the first set of child sensors to generate one or more additional sensor results in the first set of sensor results.

19. The method of claim 15, wherein each signal in the plurality of signals is used to monitor the software system based on at least one of a schedule, a trigger, or a deadline.

20. An apparatus, comprising:
one or more processors; and
memory storing instructions that, when executed by the one or more processors, cause the apparatus to perform the steps of:
monitoring a software system for a plurality of anomalies via a plurality of signals;
determining that one or more signal results associated with the plurality of signals indicate a presence of a first anomaly in the software system;
identifying a hierarchy of sensors associated with the first anomaly, wherein the hierarchy of sensors includes (a) a parent sensor at a first level of the hierarchy and (b) a first set of child sensors that are direct or indirect descendants of the parent sensor in the hierarchy, the first set of child sensors being at a second level of the hierarchy that is lower than the first level of the hierarchy;
executing the parent sensor and the first set of child sensors to analyze one or more portions of the software system for one or more causes of the first anomaly;
determining the one or more causes of the first anomaly based on a first set of sensor results generated by the parent sensor and the first set of child sensors; and
causing remediation of the one or more causes of the first anomaly based on one or more child sensors associated with the one or more causes of the first anomaly and one or more resolutions mapped to the one or more child sensors.

\* \* \* \* \*

UNITED STATES PATENT AND TRADEMARK OFFICE
CERTIFICATE OF CORRECTION

PATENT NO. : 12,072,784 B2  
APPLICATION NO. : 17/967287  
DATED : August 27, 2024  
INVENTOR(S) : Dupont et al.

Page 1 of 1

It is certified that error appears in the above-identified patent and that said Letters Patent is hereby corrected as shown below:

On the Title Page

Column 1, item (72) under inventors, Line 8, delete "Mckinney," and insert -- McKinney, --, therefor.

Signed and Sealed this  
Seventh Day of January, 2025

Derrick Brent  
*Acting Director of the United States Patent and Trademark Office*